United States Patent [19]
Gardner et al.
[11] 3,815,097
[45] June 4, 1974

[54] DISC DRIVE DIAGNOSTIC DISPLAY APPARATUS

[75] Inventors: Thomas E. Gardner, Mountain View; Mihail C. Popovici, Sunnyvale, both of Calif.

[73] Assignee: Memorex Corporation, Santa Clara, Calif.

[22] Filed: Aug. 20, 1972

[21] Appl. No.: 285,033

[52] U.S. Cl. .......... 340/172.5
[51] Int. Cl. .......... G05b 23/02, G06f 3/14
[58] Field of Search .......... 340/172.5, 174 CT

[56] References Cited

UNITED STATES PATENTS

| | | | |
|---|---|---|---|
| 3,387,279 | 6/1968 | Briley | 340/172.5 |
| 3,413,619 | 11/1968 | Briley | 340/174 CT |
| 3,443,116 | 5/1969 | Mann et al. | 307/88 |
| 3,544,971 | 12/1970 | Looschen | 340/172.5 |
| 3,646,520 | 2/1972 | Spencer | 340/172.5 |

*Primary Examiner*—Paul J. Henon
*Assistant Examiner*—Paul R. Woods
*Attorney, Agent, or Firm*—Limbach, Limbach & Sutton

[57] ABSTRACT

A disc drive having a plurality of drive function binary registers and a plurality of binary status buses that are connected to a single output for conveying information to a file control unit of a central computer processer. A desired register or status bus is selected for connection to the single output by a command signal from the file control unit. A visual diagnostic display circuit is also connected to this single output and is made operable to display the state of a selected binary register or status bus in the intervals between commands from the file control unit. The register or status bus to be displayed is selected by a manual switch on the panel of the disc drive and is completely independent of the register or status bus selected at different time intervals by the file control unit.

5 Claims, 2 Drawing Figures

| MANUAL SWITCH 81 POSITION | DISPLAYED FUNCTION | BIT SIGNIFICANCE (DISPLAY LIGHT IDENTIFICATION) | | | | | | | | |
|---|---|---|---|---|---|---|---|---|---|---|
| | | 256 | 128 (117) | 64 (115) | 32 (113) | 16 (111) | 8 (109) | 4 (107) | 2 (105) | 1 (103) |
| 0 | CYLINDER ADDRESS REGISTER | 256 | 128 | 64 | 32 | 16 | 8 | 4 | 2 | 1 |
| 1 | HEAD ADDRESS REGISTER | * | REVERSE | 256 CAR | 256 DAR | 16 | 8 | 4 | 2 | 1 |
| 2 | DIFFERENCE ADDRESS REGISTER | 256 | 128 | 64 | 32 | 16 | 8 | 4 | 2 | 1 |
| 3 | STATUS OF DRIVE | DEVICE CHECK | INDEX ERROR | OFFSET ACTIVE | SEEK INCOMPLETE | SEEK COMPLETE | ON LINE | ATTENTION | BUSY | SECTOR READY |
| 4 | MON/DIAG | * | * | DIAG 4 | DIAG 2 | DIAG 1 | * | MON 4 | MON 2 | MON 1 |
| 5 | MON STATES | * | 8 | 7 | 6 | 5 | 4 | 3 | 2 | 1 |
| 6 | INOP 1 (SEQU) | * | E.R. LOSS | SW. FAILURE | E.R. ACTIVE | SERVO RETRACT | SERVO ERROR | HDS. RET. SW. ERROR | UP SPEED ERROR | LAUNCH ERROR |
| 7 | INOP 2 (R/W) | * | WR. OVERRUN | A.C. WRITE | WRITE FAIL | SUBTRACTOR FAIL | MULTI WRITE | MULTI HEAD | 36V REG FAIL | MULTI DATA |
| 8 | INOP 3 (R/W) | * | WR. OFFSET | WR. FINE TK | READ, WRITE | SHORT WRITE | A.C. S.S. FAIL | A.M. S.S. FAIL | SINK FAIL | SPARE |
| 9 | POSITION OF SWITCHES | * | READ ONLY | START 1 | START 2 | UP SPEED | HDS. RET | DOOR CLOSED | DOOR LOCKED | SW. FAILURE |

FIG. 2.

DISC DRIVE DIAGNOSTIC DISPLAY APPARATUS

BACKGROUND OF THE INVENTION

This invention relates generally to electronic computer magnetic storage disc drives, and more specifically relates to a diagnostic test system for a disc drive.

Present electronic computing systems include as primary components a central processing unit including a file control unit and a plurality of peripheral magnetic disc storage units. The central file control unit interrogates selected disc storage units at the appropriate times for entering information thereinto for storage or for reading information therefrom that has been previously stored. Each disc storage unit includes a disc pack having a plurality of concentric magnetic discs as a single structure with enough space between the discs to permit insertion of magnetic read/write heads. A disc pack is removably held by a disc drive that rotates the disc pack at a high speed. A plurality of fingers, each having a magnetic read/write head held thereon, fit between the disc of a disc pack and are moved between various circular tracks thereof (cylinders) by precision electromechanical control mechanisms within the disc drive. Each cylinder contains a plurality of magnetic information recording tracks.

A disc drive contains a plurality of binary function command registers which are set by external command means so that the disc drive will execute certain desired functions. The disc drive also contains status buses which carry in binary form signals representative of the state or status or various electrical and mechanical elements within the disc drive. A single one of the binary register outputs or one of the status buses are connected to a single data output bus upon command from the external file control unit. The single data output bus of the disc drive is connected to transmit information of the selected register or status bus back to the file control unit. Such communication enables the file control unit to determine the existing state of certain elements within the disc drive from which a command may be formulated to change that state.

Disc drives are complicated pieces of electronic and mechanical components that must operate with a high degree of precision and with a very low malfunction rate. It is a primary object of the present invention to provide a disc drive that permits quick detection by an operator as to the various states of the disc drive so that any malfunctions or incorrect states may be corrected in a short period of time. One disc drive presently being marketed indicates visually the cylinder address to which the magnetic read/write heads are being commanded to be set by providing a plurality of lights on the disc drive panel that are connected to monitor the binary output of the disc drive cylinder register. However, it is an object of the present invention to provide with simple circuitry the capability of displaying additional information as to various additional other elements of the disc drive.

SUMMARY OF THE INVENTION

These and additional objects are accomplished by the present invention wherein a single visual display circuit is connected to a single data output bus of a disc drive to display a selected binary register output or a binary status bus signal that is connected with the single data output bus. The register or status bus whose signal is to be displayed is selected by a manual switch located on the panel of the disc drive adjacent the visual indicator. This switching circuit and the visual display circuit are disabled, however, whenever the file control unit sends a command to the disc drive for certain register or status bus binary signals to be sent back to it. The diagnostic visual display circuit therefore operates on the output data bus on a time sharing basis with the file control unit. The diagnostic display is operable in those time intervals wherein information is not being commanded by the external file control unit. This time sharing technique allows addition of a diagnostic display to a disc drive with a minimum amount of additional circuitry required.

Additional objects and advantages of the various aspects of the present invention will become apparent from the following detailed description of a preferred embodiment thereof which should be taken in conjunction with the accompanying drawings.

BRIEF DESCRIPTION OF THE DRAWINGS

FIG. 2 is a chart for a specific diagnostic display system according to FIG. 1 which shows various disc drive functions which may be monitored by the display.

DESCRIPTION OF THE PREFERRED EMBODIMENT

Figure 1:
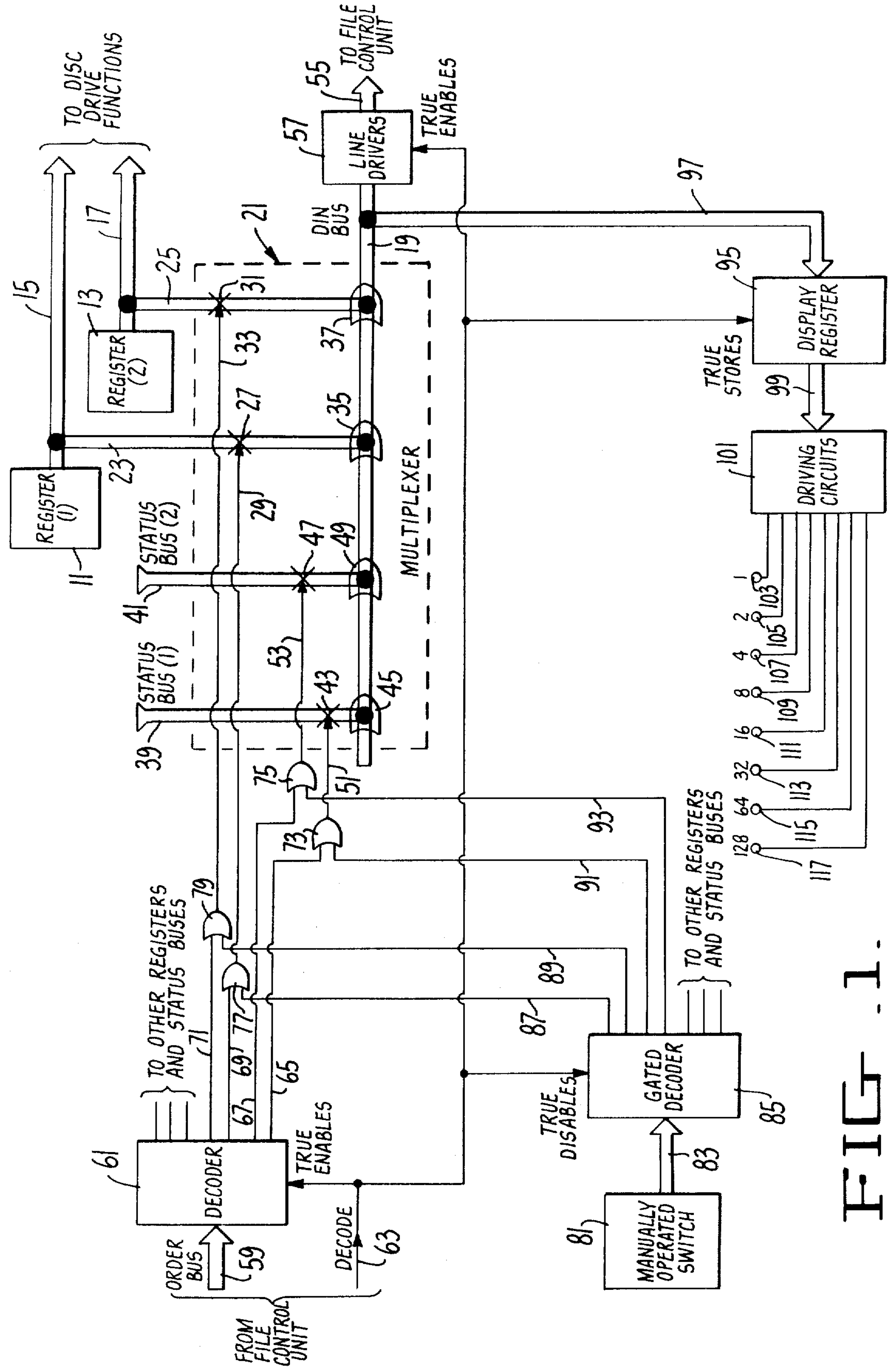
FIG. 1 is a block diagram of a portion of a disc drive electronic circuitry including diagnostic display circuits according to the present invention.

Referring to FIG. 1, a portion of a disc drive electronic circuit is schematically illustrated. Two registers 11 and 13 are illustrative of the plurality of registers that exist in a disc drive which control various drive functions. For instance, the register 11 could be the cylinder address register into which a signal is placed representative of the desired cylinder on the magnetic discs that the read/write heads are to be positioned. The register 13 could be, for instance, a head address register which is set by the actual cylinder position of the read/write heads. Output lines 15 and 17 that carry in binary form the state of the registers 11 and 13, respectively, are connected with additional electronic and mechanical elements to assure that the heads move from the existing position to new desired cylinder positions. The signals carried in the output lines 15 and 17 from the registers are generally eight bit binary signals.

The signals from all of the registers within the disc drive including the two representative registers 11 and 13 shown in FIG. 1 are combined onto a single data bus 19 by a multiplexing circuit 21. Lines 23 and 25 are connected, respectively, to the register output lines 15 and 17. The line 23 contains a switching circuit 27 operated by a signal in a control line 29. Similarly the line 25 from the output of the register 13 contains a switching circuit 31 which is operated by a signal in a control line 33. The switching circuits 27 and 31 are operated so that the binary signals in one of the register 11 and 13 may be connected through appropriate logic multiplexing circuitry to the single data output bus 19. The logic circuitry may include DOT OR gates 35 and 37 in one implementation connecting the lines 23 and 25, respectively, to the single data output bus 19. When DOT OR logic elements are used, the switches 27 and 31 are preferably NAND gates.

Besides the state of various registers within the disc drive, binary signals from a plurality of status buses, such as buses 39 and 41, are connected to the single data output bus 19. The status buses 39 and 41 carry binary signals of eight bits, for example, that give information as to the state or status or various electromechanical elements within the disc drive. The information as to the position of switches within the disc drive is an example of one of the statuses that is carried by a status bus.

A gated line driving circuit 57 is interposed between the data bus 19 and an output line 55. The particular register or status bus that is turned on at a given time to convey its information to the file control unit through the output line 55 is selected by a signal from the file control unit through an order bus 59 that is connected with a gated decoder circuit 61 within the disc drive. A command to connect a given status bus or register to the single data bus 19 is received in binary form from the file control unit through the order bus 59. A command execution signal is also received from the file control unit through a decoding line 63. A decode signal in the line 63 tells the circuitry shown in FIG. 1 of the disc pack to read out the state of the status bus or register that is selected by the command signal existing on the order bus 59.

The gated eecoder 61 contains a plurality of output control lines, one such line for each status bus and register that is to be selectively connected to the single data bus 19 upon a command from the file control unit. The decoder output lines include lines 65, 67, 69 and 71 which are connected, respectively, to OR gates 73, 75, 77, and 79, whose outputs are, respectively, lines 51, 53, 29, and 33. When a signal appears on the order bus 59 to select, for instance, the register 11 for connection to the single data output bus 19, a signal will appear in the line 69 at the output of the decoder 61 when the decode signal in the line 63 is in its true condition. This signal in the line 69 is such that the control signal is presented in the line 29 to turn on the switching circuit 27 and connect the output of the register 11 with the single data output bus 19. Only one output line of the decoder 61 carries such an enabling signal at any one time. Therefore, the state of only the register 11 is connected back to the file control unit through the gated driving circuit 57. The driving circuit 57 is also enabled through signal in the decode line 63.

Since the file control unit generally interrogates the various registers and status buses of the disc drive for only a portion of the time, no signal exists on the single output bus 19 during remaining periods of time. This time that the output bus 19 is normally not used is employed according to the techniques of the present invention for displaying the binary signal on a selected status bus or register wholly independently of whatever information the file control unit may be commanding of the disc drive. The desired status bus or register output for the diagnostic display is selected by a manually operated switch 81 that is physically located on the control panel of a disc drive unit for easy access by an operator. The switch 81 is connected by a line 83 to a gated decoder 85 which has a plurality of output lines which are selectively enabled one at a time by operation of the manually operated switch 81. Lines 87, 89, 91 and 93 at the output of the gated decoder 85 are connected to second inputs of the OR gates 77, 79, 73 and 75, respectively. The command signal line 63 is also connected to the gated decoder 85 so that one of its output lines selected by the switch 81 is energized only when the file control unit is not commanding the connection of a certain status bus or register with the data output bus 19. That is, a true signal in the decode line 63 disables the gated decoder 85. The binary signal presented on the data bus 19, therefore, alternates between the output of the status bus or register selected by the file control unit through the order bus 59 and that selected by the switch 81 in response to the decode signal in the line 63 changing between true and untrue states, respectively.

When the decode signal in the line 63 is in its true state, the signal on the bus 19 is passed to the file control unit through the gated line driving circuit 57. When the decode signal in the line 63 is untrue, however, nothing is passed to the file control unit, but rather the signal on the data bus 19 is applied to a gated display register 95 through a line 97. The register 95 is of a type to pass through to its output 99 the signal existing in the line 97 at all times except when the decode signal in the line 63 from the file control unit is in its true state. When true, the register 95 stores the signal in the line 97 which existed immediately preceding the receipt from the file control unit in the line 63 of the true decode signal. When the decode signal is true, the driving circuit 57 then passes the state of the data bus 19 onto the file control unit while the display register 95 remains fixed to the signal on the data bus 19 which was selected in the previous period of time by the switch 81.

The signal in the line 99 at the output of the display register 95 is thus the binary signal in the status bus or command register in the disc drive that is selected by the switch 81. This signal in the line 99 is updated during the intervals of time wherein the decode signal in the line 63 is not true. Driving circuits 101 receive the signal in the line 99 and control a plurality of display lights permanently installed on the panel of the disc drive, these lights indicated in FIG. 1 with reference characters 103–117. There is one display light for each binary bit of the signal in the line 99. Throughout the example herein, eight bit binary signals are used and, therefore, there are eight display lights on the disc drive panel supplied by the driving circuits 101. Each of the lights 103–117 is marked with the significance of the bit that the light represents, as shown in FIG. 1, so that an operator can readily determine the signal of the status bus or register that he has selected by the switch 81.

FIG. 2 is a chart of a particular diagnostic display wherein the switch 81 of FIG. 1 has 10 states 0–9 as indicated in the left-hand column of FIG. 2. The second column of FIG. 2 indicates a register or status bus selected by that particular switch position. The remaining columns of FIG. 2 show what is meant when each of the eight display lights is lit. For instance, if the switch 81 is in its position 3, the display lights are connected with a status bus connected to the status of the read/write head drive mechanism. If the light 105 of FIG. 1 (two bit singificance) is lit, it indicates that the drive mechanism is busy. If the light 113 is lit (32 bit significance) it indicates that the drive mechanism failed to find the cylinder position which is being commanded by the cylinder address register. If the switch 81 is in its zero position, the cylinder address register is connected with the lights so that an operator may determine the cylinder on the magnetic disc to which the address is commanding the drive mechanism to position the read/write heads.

Although the various aspects of the present invention have been described with respect to a specific preferred embodiment thereof, it is to be understood that the invention is entitled to protection of the full scope of the appended claims.

I claim:

1. In a computer memory disc drive having an input circuit for receiving instructions and an execution signal from a file control unit, means for generating a plurality of binary signals representative of various stored commands to disc drive functions and representative of the status of various mechanical and electrical elements of the disc drive, an output circuit for communicating said command and status binary signals to the file control unit, and means responsive to an instruction at said input from the file control unit for connecting one of said command and status binary signals at a time to said output circuit, the improvement comprising:

means receiving the command and status binary signals and responsive to the execution signal for connecting a selected one of said command and status binary signals to said output circuit when no execution signal is being received by said input circuit, and means connected to said output circuit for visually displaying said selected one of said command and status signals.

2. The improved disc drive of claim 1 wherein said display means includes means responsive to said execution signal for receiving said selected one of said command and status signals from the output circuit only when no command execution signal is being received at the input circuit.

3. The improved disc drive of claim 2 wherein said receiving means includes means for storing said selected one of said command and status signals from the output that exists when a command execution signal is being received at the input circuit.

4. The improved disc drive of claim 3 wherein said display means additionally includes a visual indicator connected to said receiving means including one independent light source responsive to each bit of the selected one of said command and status signals.

5. A computer memory disc drive, comprising:

a plurality of drive function registers each having a binary signal output, a plurality of status buses carrying in binary form signals representative of the state of various electrical and mechanical elements of the disc drive, means receiving the binary signals from said plurality of function registers and from said plurality of status buses for connection to a single data bus, a plurality of switches, one switch placed in the path of each of said binary signals from said plurality of registers and status buses before the signals are applied to said combining means, each switch additionally being operable between conductive and non-conductive states by a control signal, means for generating a control signal to one of said switches at a time, said generating means including a decoder receiving command signals from a file control unit for generating a control signal according to the command signal when a decode signal from the file control unit is in a first state, said generating means additionally including means manually operated for generating a control signal according to a manual selection when a decode signal from the file control unit is in a second state, line driving circuit means receiving signals from the single data bus for presenting them to an output for connection to the file control unit when the decode signal from the file control unit is in its said first state, and means receiving signals from the single data bus for visually displaying said signals that occur while said decode signal from the file control unit is in its said second state, whereby a binary signal commanded by said file control unit is presented at said output from the single data bus when said decode signal is in its first state and another binary signal selected by the manually operated means is visually displayed in another period of time from said data bus when said decode signal is in its second state.

* * * * *